(12) United States Patent
Vagman et al.

(10) Patent No.: US 10,197,394 B2
(45) Date of Patent: Feb. 5, 2019

(54) METHOD AND SYSTEM FOR ANALYZING SPATIAL MEASURING DATA

(71) Applicant: HEXAGON METROLOGY (ISRAEL) LTD., Ramat HaSharon (IL)

(72) Inventors: Tal Vagman, Tel Aviv (IL); Dan Albeck, Givat Shmuel (IL)

(73) Assignee: HEXAGON METROLOGY (ISRAEL) LTD., Ramat Hasharon (IL)

( * ) Notice: Subject to any disclaimer, the term of this patent is extended or adjusted under 35 U.S.C. 154(b) by 224 days.

(21) Appl. No.: 15/035,188

(22) PCT Filed: Aug. 5, 2014

(86) PCT No.: PCT/IL2014/050707
§ 371 (c)(1),
(2) Date: May 6, 2016

(87) PCT Pub. No.: WO2015/068152
PCT Pub. Date: May 14, 2015

(65) Prior Publication Data
US 2016/0282110 A1    Sep. 29, 2016

(30) Foreign Application Priority Data

Nov. 6, 2013   (EP) ..................................... 13005240

(51) Int. Cl.
*G01B 21/00*   (2006.01)
*G01B 21/04*   (2006.01)

(52) U.S. Cl.
CPC ........... *G01B 21/04* (2013.01); *G01B 21/045* (2013.01)

(58) Field of Classification Search
CPC ...... G01B 21/04; G01B 21/045; G01B 11/14; G01B 11/2527; G01B 11/254;
(Continued)

(56) References Cited

U.S. PATENT DOCUMENTS 4,961,267 A * 10/1990 Herzog .................. G01B 5/008
33/1 M
5,751,856 A *  5/1998 Hirabayashi ............ G06T 9/008
375/E7.14
(Continued)

FOREIGN PATENT DOCUMENTS

| CN | 101310687 A | 11/2008 |
|----|-------------|---------|
| CN | 101688813   | 3/2010  |

(Continued)

*Primary Examiner* — Yaritza Guadalupe
(74) *Attorney, Agent, or Firm* — Maschoff Brennan

(57) ABSTRACT

Some embodiments of the invention include a method for analyzing spatial measuring data. The method may include an evaluation process with a multitude of measurement processes that are timely and/or spatially distributed over the elements of a set of one, two or a multitude of basically identical items, the items each having one or more features. In some embodiments, the multitude of measurement processes include at least a first and a second measurements of spatial data by means of at least one sensor system comprising at least one sensor. In some embodiments, each measurement of spatial data comprises providing a sensor reference system for each sensor, and measuring and/or extrapolating one or more spatial values of the features of an item of the set of items by means of the at least one sensor.

19 Claims, 8 Drawing Sheets

(58) Field of Classification Search
CPC ............... G01B 11/24; G01B 11/2513; G05B 19/41875; G05B 2219/35489; G05B 2219/35497; G05B 23/024; G05B 23/0272
USPC .......................................................... 33/503
See application file for complete search history.

(56) References Cited

U.S. PATENT DOCUMENTS

| | | | |
|---|---|---|---|
| 5,852,672 A | 12/1998 | Lu | |
| 6,134,506 A * | 10/2000 | Rosenberg | B25J 9/1692 33/502 |
| 6,922,904 B2 * | 8/2005 | Groell | G01B 5/012 33/503 |
| 7,545,516 B2 * | 6/2009 | Jia | G01B 11/2527 356/602 |
| 7,672,500 B2 | 3/2010 | Albeck et al. | |
| 8,144,951 B2 | 3/2012 | Martin et al. | |
| 9,582,870 B2 * | 2/2017 | Vagman | G06T 7/001 |
| 9,671,217 B2 | 6/2017 | Metzler | |
| 2004/0128102 A1 | 7/2004 | Petty et al. | |
| 2009/0080766 A1 | 3/2009 | Daxauer et al. | |
| 2015/0176956 A1 * | 6/2015 | Pettersson | G01B 21/04 33/503 |
| 2015/0204653 A1 * | 7/2015 | Przygodda | G01B 21/045 33/503 |
| 2015/0248755 A1 * | 9/2015 | Vagman | G06T 7/001 382/103 |
| 2015/0266183 A1 * | 9/2015 | Alifragkis | B25J 9/1692 700/254 |
| 2016/0195382 A1 * | 7/2016 | McMurtry | G01B 21/045 33/503 |
| 2016/0282110 A1 * | 9/2016 | Vagman | G01B 21/045 |

FOREIGN PATENT DOCUMENTS

| | | |
|---|---|---|
| DE | 19544240 A1 | 6/1996 |
| EP | 2 541 194 A1 | 1/2013 |
| WO | 98/27514 A2 | 6/1998 |
| WO | 2008/133927 A1 | 11/2008 |
| WO | 2014029622 A1 | 2/2014 |

\* cited by examiner

METHOD AND SYSTEM FOR ANALYZING SPATIAL MEASURING DATA

FIELD OF THE INVENTION

The present invention pertains to the field of quality assurance for production processes. More specifically, the present invention relates to a system and a method for analyzing and monitoring the output of a production process, by joining spatial measuring data of the same object or of two or more objects of the same kind, the data being obtained by means of a plurality of different sensors. The present invention allows the compilation of spatial measuring data from various sources about a single object into a single output file or similar data structure. According to the invention, spatial measuring data is processed to transform and integrate the data into a common reference system to be able to compare the measuring data with CAD data and to display the results in a unified way.

BACKGROUND

It is common practice during the industrial production of goods such as a car to measure features and properties of its different components. These measurements can be carried out in special measurement cells by means of either contact or non contact measuring gauges, for example based on laser or photogrammetric principles. Such a procedure, for instance, is disclosed in DE 195 44 240 A1.

U.S. Pat. No. 7,672,500 discloses a method for monitoring and visualizing the output of a production process, whose output materials or items are inspected by one or more inspection units. The inspection units scan or otherwise inspect each of a series of items or material being produced by a production process, and an image is generated representing each of the inspected items, wherein differences between the items can be visually coded.

The purpose of such methods is to determine possible errors of the measured object during product development, launch or during production. Disadvantageously though, in the measurement process, there can occur various additional errors, that prevent or complicate the determination of the errors of the object. This is especially the case if a high precision detection of errors is needed.

On the one hand, errors can occur in the positioning of the object during the measurement, and on the other hand, further errors can occur in the measurement of every single sensor that is used for measuring the object.

From document WO 2014/029622 A1 a method and device for minimizing errors in the positioning of the measured object are known. The solution disclosed therein utilizes a reference positioning system (RPS) for placing and aligning objects, for instance a car body, on a support. However, the disclosed solution does not consider sensor-inherent errors.

SUMMARY

Some embodiments of the present invention provide an improved method and an improved system for analyzing spatial measuring data.

Some embodiments provide such a method and system for analyzing data of the output of a production process or determining production errors.

Some embodiments provide such a method and system wherein systematic sensor-related errors can be eliminated.

Some embodiments of the invention provide such a method, wherein the data are integrated in a common reference coordinate system.

Some embodiments of the invention provide such a method, wherein measured data is comparable with existing CAD and/or nominal data.

Some embodiments A further object of the invention is to provide such a method, wherein the results are displayable in a unified way.

A method for analyzing spatial measuring data according to the invention comprises an evaluation process with a multitude of measurement processes that are timely and/or spatially distributed over the elements of a set of one, two or a multitude of basically identical items, the items each having one or more features. The multitude of measurement processes comprises at least a first and a second measurements of spatial data by means of at least one sensor system, each comprising at least one sensor. Each measurement of spatial data comprises providing a sensor reference system for each sensor, and measuring and/or extrapolating one or more spatial values of the features of an item of the set of items by means of the at least one sensor. According to the invention, the method is characterized by a spatial distance and/or a time interval between the first and second measurements of spatial data, and further comprises transforming the sensor reference systems and providing a unified reference system for all sensors, the unified reference system being related to at least one item of the set of items or to a support of the at least one item of the set of items; subtracting sensor-related errors from the measured spatial data; and providing a database for the values measured and/or extrapolated during the first and second measurements of spatial data with the unified reference system.

The term "basically identically items" in terms of this application is to be understood as meaning the same kind of objects, in particular wherein the objects differ from each other—if at all—only within given production tolerances and/or by alterations from the planned design due to production errors that are to be determined by means of the inventive method and system.

In a particular method for analyzing spatial measuring data according to the invention comprises an evaluation process for an item that has one or more features. The evaluation process comprises at least a first and a second measurements of spatial data by means of at least one sensor system comprising at least one sensor, each measurement of spatial data comprising providing a sensor reference system for each sensor, and measuring and/or extrapolating one or more spatial values of the features of the item by means of the at least one sensor. According to the invention, the method is characterized by a distance between a first sensor system performing the first measurement of spatial data and a second sensor system performing the second measurement of spatial data, and/or a time interval between the first and second measurements of spatial data, and further comprises transforming the sensor reference systems and providing a unified reference system for all sensors, the unified reference system being related to the item or to a support of the item; subtracting sensor-related errors from the measured spatial data; and providing a database for the values measured and/or extrapolated during the first and second measurements of spatial data with the unified reference system.

In one embodiment of the method according to the invention, the first and second measurements of spatial data are both performed on the same item, in particular wherein a processing step of the item is performed between the first and second measurements of spatial data.

In one embodiment of this method, the second measurement of spatial data is performed by a different sensor system than the first measurement of spatial data, in particular wherein a plurality of measurements of spatial data of the first item is performed sequentially by a plurality of sensor systems.

In another embodiment of this method, a plurality of measurements of spatial data of the first item is performed sequentially by a plurality of sensor systems.

In a further embodiment of this method, at least two measurements of spatial data of the first item are performed by the same sensor system.

In one embodiment of the method according to the invention, the spatial distance between the first and second measurements of spatial data, comprises a spatial distance between a first position and a second position of the same sensor system, wherein the sensor system performs the first measurement in the first position and the second measurement in the second position, or between a first sensor system performing the first measurement of spatial data and a second sensor system performing the second measurement of spatial data.

In another embodiment of the method according to the invention, providing a sensor reference system comprises a referencing of the at least one sensor to a reference point, wherein the reference point has a defined position in the unified reference system, either being positioned on at least one item of the set of items or on a support, on which the position of at least one item of the set of items is fixedly defined, and the position of the reference point is determinable by the at least one sensor of each sensor system. In particular, the reference point is a projection of a projecting means of the respective sensor system, in particular a laser spot or a part of a projected laser line or pattern, or part of a referencing means adapted to allow a referencing of the sensors in six degrees of freedom.

In one embodiment of this method, referencing the sensors to the reference point comprises an image or data stitching process for combining data of the sensors of the respective sensor system by using overlapping spatial data of at least two sensors.

In a further embodiment of the method according to the invention, providing a sensor reference system comprises a referencing of the at least one sensor to a reference point, wherein the reference point has a defined position in the unified reference system, either being positioned on at least one item of the set of items or on a support, on which the position of the at least one item of the set of items is fixedly defined, and the position of the reference point and a position and orientation of the at least one sensor are determinable by an external referencing system comprising at least one external referencing device, particularly a laser tracker. In particular, the at least one sensor comprises sensor referencing means adapted to allow determining the orientation of the sensor in six degrees of freedom and the reference point is part of a referencing means adapted to allow a referencing of the external referencing device in six degrees of freedom.

A further embodiment of the method according to the invention comprises generating an image representing the at least one measured item of the set of items and comprising measured and/or extrapolated values of the features of the at least one measured item of the set of items. In particular, the method further comprises comparing at least one of the measured or extrapolated values against a corresponding stored value to determine a difference value, and wherein the generated image represents the at least one measured item of the set of items, wherein an area or section of the image corresponding to an area or section of the at least one measured item of the set of items associated with the at least one of the measured or extrapolated values which was compared to the stored value is visually coded to indicate the corresponding value or difference value.

The invention also pertains to a measuring system for analyzing spatial measuring data, particularly according to the method according to the invention. Such a measuring system for analyzing spatial measuring data is adapted for for an evaluation process with a multitude of measurement processes that are timely and/or spatially distributed over the elements of a set of one, two or a multitude of basically identical items, the items each having one or more features. The measuring system comprises at least one sensor system with at least one sensor, the at least one sensor system being adapted for performing the multitude of measurement processes, the multitude of measurement processes comprising at least a first and a second measurements of spatial data of one of the items, wherein the at least one sensor is adapted to reference itself to a reference point, providing a sensor reference system for every sensor, and measure and/or extrapolate one or more spatial values of each feature of the set of items. According to the invention, the at least one sensor system is adapted to perform the first and second measurements of spatial data with a spatial distance and/or a time interval between the first and second measurements, and computing means of the measuring system are adapted to transform the sensor reference systems into a unified reference system for all sensors, the unified reference system being related to at least one item of the set of items or to a support of the at least one item of the set of items; subtract sensor-related errors from the measured spatial data; and provide a database for the values measured and/or extrapolated during the first and second measurements of spatial data with the unified reference system.

In one embodiment of the measuring system, the reference point has a defined position in the unified reference system, either being positioned on at least one item of the set of items or on a support, on which the position of the at least one item of the set of items is fixedly defined, and at least one sensor of each sensor system is adapted for determining the position of the reference point.

In a further embodiment of the measuring system, the reference point is part of a referencing means adapted to allow a referencing of the at least one sensor in six degrees of freedom, and/or at least one sensor system comprises projecting means adapted for projecting the reference point on the at least one item of the set of items or on the support, particularly in form of a laser spot or as a part of a projected laser line or pattern.

In another embodiment of the measuring system, for referencing the at least one sensor to the reference point, at least two sensors are adapted for taking images of a part of the at least one item of the set of items, wherein the images have a common overlap area, and wherein the computing means is adapted to use image or data stitching for combining data of the sensors of the respective sensor system, in particular for constituting the unified reference system.

In another embodiment of the measuring system, for referencing the at least one sensor to the reference point in six degrees of freedom and/or for transforming the sensor reference systems into a unified reference system, an external referencing system comprising at least one external referencing device is adapted for determining the positions and orientations of the at least one sensor and the reference point, in particular wherein the external referencing device is a laser tracker, the at least one sensor comprises sensor referencing means and the reference point is part of a referencing means.

One embodiment of the measuring system comprises a support adapted to accept at least one item of the set of items in such a way that the position of the item is fixedly defined relative to the support, wherein the support comprises the reference point, in particular wherein the support comprises referencing means comprising a pattern that at least one sensor of the respective sensor system is adapted to detect, allowing a referencing of the sensors in six degrees of freedom.

In a further embodiment of the measuring system, the computing means of the measuring system is adapted to generate an image representing the set of items. In particular, the computing means is adapted to compare at least one of the measured or extrapolated values against a corresponding stored value to determine a difference value; and an area or section of the image corresponding to an area or section of the set of items associated with the at least one of the measured or extrapolated values which was compared to the stored value is visually coded to indicate the corresponding value or difference value.

The invention also pertains to a computer programme product for execution of the method according to the invention. A computer programme product, comprising programme code which is stored on a machine-readable medium, or being embodied by an electromagnetic wave comprising a programme code segment, according to the invention has computer-executable instructions for performing, at least the following steps of the method for analyzing spatial measuring data:
  transform the sensor reference systems and provide a unified reference system for all sensors, the unified reference system being related to at least one item of the set of items, or to a support of the at least one item of the set of items;
  subtract sensor-related errors from the measured spatial data; and
  provide a database for the values measured and/or extrapolated during the first and second measurements of spatial data with the unified reference system.

BRIEF DESCRIPTION OF THE DRAWINGS

The invention in the following will be described in detail by referring to exemplary embodiments that are accompanied by figures, in which.

DETAILED DESCRIPTION

Figure 1:
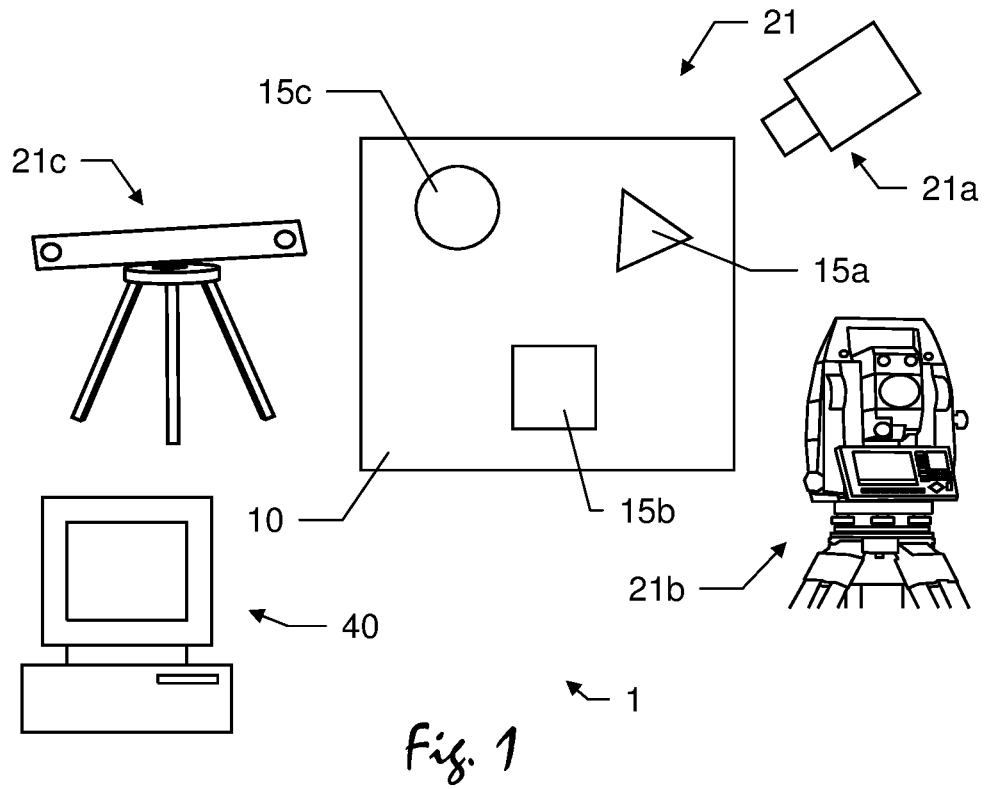
FIG. 1 shows—in an abstract way—an embodiment of a measuring system according to the invention for measuring and visualising the output of a production process, the system comprising one sensor system measuring features of an item.

FIG. 1 shows an abstract example of an embodiment of a sensor system measuring features 15a-c of an item 10. The shown exemplary embodiment of a measuring system 1 according to the invention is adapted to measure spatial data of the item 10, particularly after the production of the item 10. The measuring system 1 comprises a computing means 40 and a sensor system 21 with three different sensors 21a-c. These sensors 21a-c are adapted for measuring values of the different features 15a-c of the item 10.

Measurement data is captured by the sensors 21a-c and computed in near real time into common digital formats. Some of the data is made available at the same time as the sensors are collecting the measurement data, whereas other sensors only provide their results at the end of the cycle process.

Many different kinds of fixed or mobile sensors can be used for the measurement of spatial data. These include:
  Single and stereo vision sensors;
  White Light sensors;
  Laser point sensors;
  Laser line triangulations sensors;
  LED vision sensors;
  Projection phase-shift sensors;
  Mechanical and electrical touch-probe sensors;
  6DOF tracking sensors;
  Temperature sensors;
  Ultra-sonic sensors; and
  CT sensors;
or any combination of these.

The spatial data that is producible by these sensors comprises:
  Surface geometries;
  Surface points;
  2D sections;
  Orientation and location of manufacturing features (holes, edges, studs, etc.);
  Geometry dimensions;
  Lines;
  Planes;
  2D and 3D distances;
  Angle resolutions;
  Symmetries;
  Material positions and thickness;
  True position; and/or
  Patterns.

Obviously, the above sensors for measuring spatial data additionally can be complemented by further sensors, such as RFID or barcode readers for identification of the item.

Figure 2:
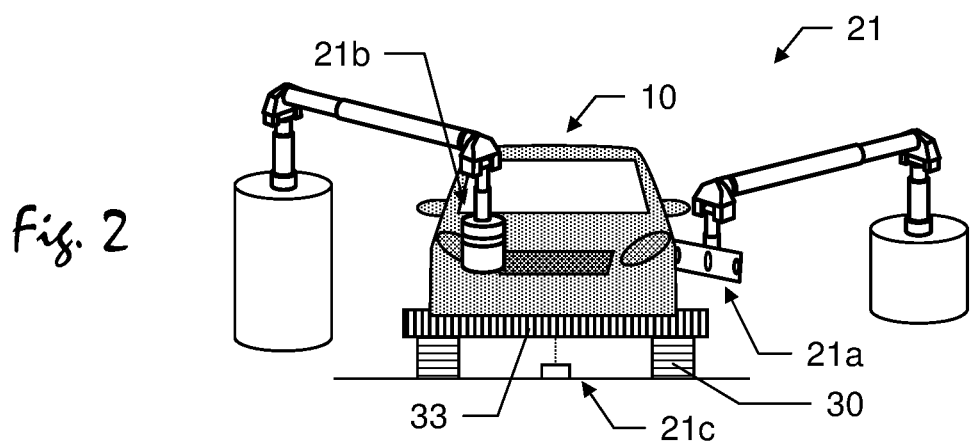
FIG. 2 shows an exemplary embodiment of a sensor system measuring a car body.

FIG. 2 shows an exemplary embodiment of a sensor system 21 measuring an item in form of a car body 10. The car body 10 is fixed on a support 33 in such a way that the position of the car body 10 thereon is fixedly defined. The car body 10 on its support 33 is moved to the sensor system 21 by means of a conveyor belt 30.

The depicted sensor system 21 comprises two measuring robots having a first and a second sensor 21*a-b*. The first sensor 21*a* is a white light scanner (WLS) and the second sensor 21*b* is a laser scanner. The WLS measures the outside surface of the item 10, for instance being an automotive sheet metal part. The laser scanner measures (in parallel to the WLS) only the edges of the item 10 for flush and gap information. A third sensor 21*c* is a laser line sensor that measures a single feature on the bottom side of the item 10 which is not accessible to the first and second sensors 21*a-b* of the measuring robots. The first and second sensors 21*a-b* are adapted to reference themselves during the measurement with respect to a reference point of the measured item 10 or of the support 33. The third sensor 21*c* is adapted to reference itself with respect to a different reference point of the measured item 10 or of the support 33.

Measurement data is captured by the sensors 21*a-c* and computed in near real time into common digital formats. As each sensor 21*a-c* has its own sensor reference system, also the data produced by the sensors 21*a-c* are provided in different sensor reference systems. The data produced by each of the sensors 21*a-c* might be subject to measurement errors related to the respective sensor 21*a-c*. Sensor-related errors can have various causes. For instance, a joint of an arm of the respective measuring robot might be worn out, or an optical element of the sensor 21*a-c* might be dislocated. Depending of the needed accuracy of the measurement data these errors can have serious effects on the quality of the production output.

The sensor system 21, therefore, is set-up in such a way that the single sensor reference systems can be transformed into a common reference system for all three sensors 21*a-c*. As every sensor has referenced itself with respect to a reference point of the item 10 or of a support on which the item's position is fixedly defined, an unified reference system being related to the item 10 or to the support 33 can be used for all sensors 21*a-c*. To do so, the single reference systems have to be transformed. This is illustrated in FIG. 3.

Figure 3:
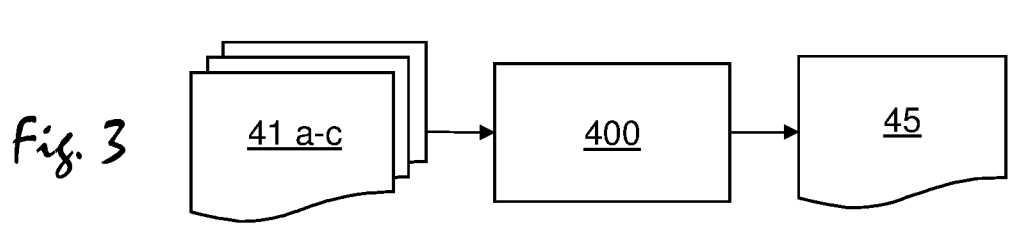
FIG. 3 is a flow chart representing a transformation and unification process of the method according to the invention.

FIG. 3 is a flow chart representing an exemplary embodiment of a transformation and unification process 400 of the method according to the invention. The data produced by the sensors 21*a-c* of FIG. 2 are provided in different sensor reference systems 41*a-c*. In order to subtract systematic sensor-related errors from the measured spatial data, the sensor reference systems 41*a-c* are transformed and unified into an item-related unified reference system 45 for all sensors. This can be done using various methods, including photogrammetry markers on the part and/or fixture during set-up, predefined robot repeatability path, overlapping areas, geometry stitching, real-time absolute positioning measuring of positioning objects, etc.

The synchronization of the data is done using unique identifiers including measurement programme, object type, serial number, start time and coordinate system.

After the transformation and unification of the data into a single layer, but in parallel to further measurements and data captures, data is aggregated into a comprehensive data repository, e. g. a file or database. This data is then made available for client applications allowing users and software processes to access the unified measurement model. In particular, the data can be used to generate an image representing the inspected item and comprising the data (spatial as well as other data) determined by all sensors.

This aggregated data includes various levels of information including small datasets, such as measurement points, locations, or distances, and large dataset information, such as surface geometries, lines, cross sections or curvatures, thickness as well as analysis information. Depending on the users and the software applications, partial or full data can be loaded for further use as needed.

The transformation and unification process 400 comprises particularly the following:

Handling of overlapping areas by multiple sensors;
Synchronizing asynchronous data flows;
Correlating measurements to a shared reference system;
Handling of inconsistencies;
Minimizing temperature effects on measurements;
Coordinating operations in real time to avoid inter-ferences;
Managing different data formats;
Managing the correct sequence and precedence of data collection, computation and unification; and/or
Applying or rejecting process requests based on object type, time intervals, etc.

With the transformation and unification process 400 sensor-related errors can be minimized or eliminated from the measurement data.

Figure 4:
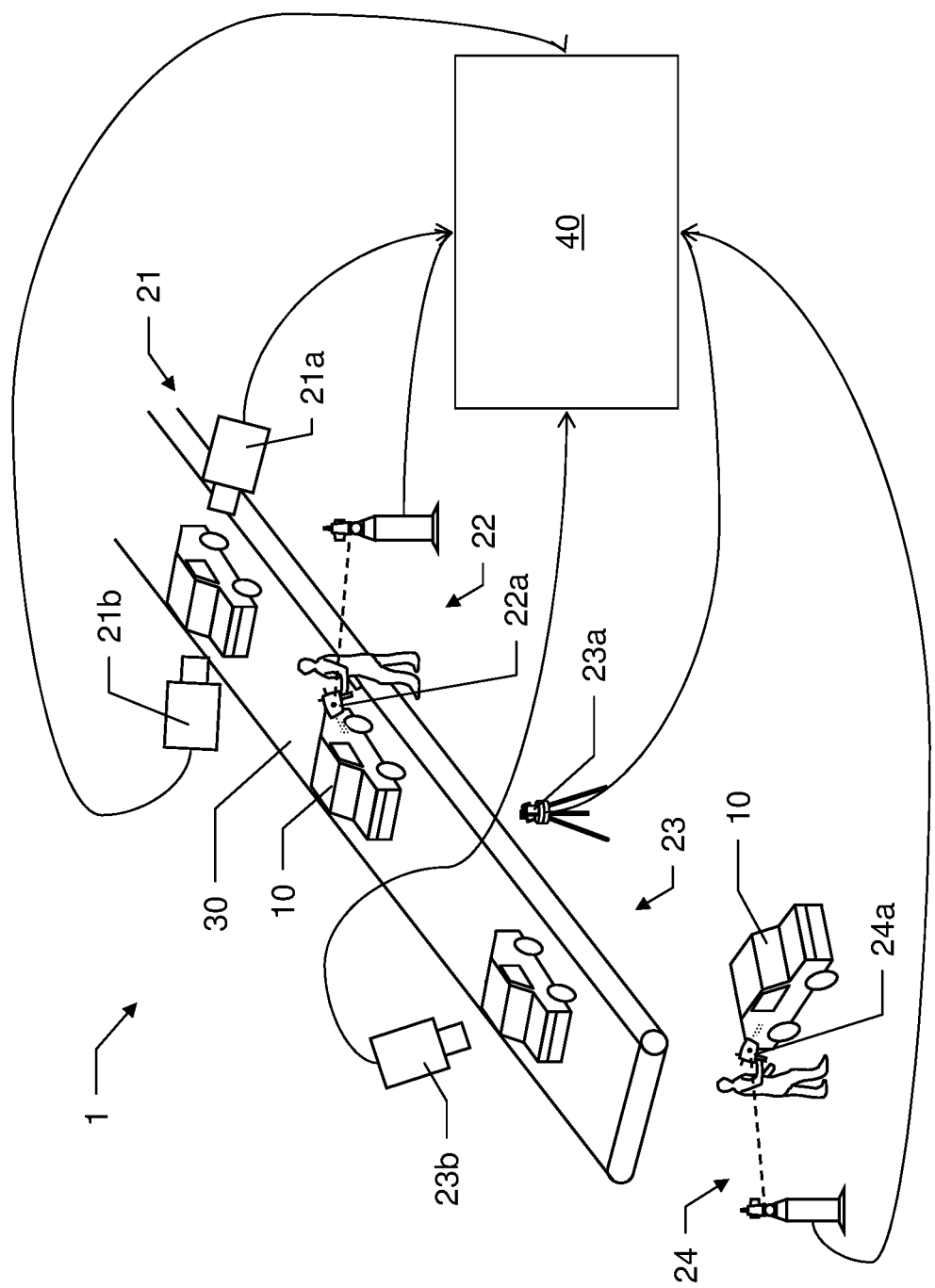
FIG. 4 shows a second embodiment of a measuring system according to the invention for measuring and visualising the output of a production process the system comprising a plurality of sensor systems.

In FIG. 4 an exemplary embodiment of the measurement system 1 according to the invention is depicted, the measurement system 1 comprising four independent sensor systems 21-24. A newly produced car 10 is inspected sequentially by each of the four sensor systems 21-24, each of which comprising at least one sensor. The car 10 is moved between the sensor systems by means of a conveyor belt 30. The first sensor system 21 comprises two image sensors 21*a-b*, such as a camera. The second sensor system 22 and the fourth sensor system 24 each comprise a laser scanner 22*a*,24*a*. The third sensor system 23 comprises one image sensor 23*a*, for instance a white light sensor, and one laser-based edge measurement device 23*b*, particularly being adapted to automatically track edges—as described for instance in EP 2 541 194 A1.

Every sensor of the measurement system 1 is adapted to reference itself relative to the measured object—here the car 10 or a part of it—while measuring the same. Each sensor then creates data from the measured values and sends the data to a computer means 40. Referencing relative to the measured object comprises determining the position of a reference point of the item to be measured—here the car 10—or of a support on which the position of the car 10 is fixedly defined (not shown). Particularly, for referencing in six degrees of freedom, the sensors are adapted for determining the position and orientation of a referencing means.

The depicted measuring evaluation process can e. g. follow a production process of the item 10. Alternatively or additionally, between the single inspections by the different sensor systems 21-24 further processing steps of the production process can be performed. For instance, a first inspection with the first sensor system 21 measures values of a feature of the item 10 before a painting process of the item, and a second inspection with the second sensor system 22 measures properties of the same feature after the painting.

Figure 5:
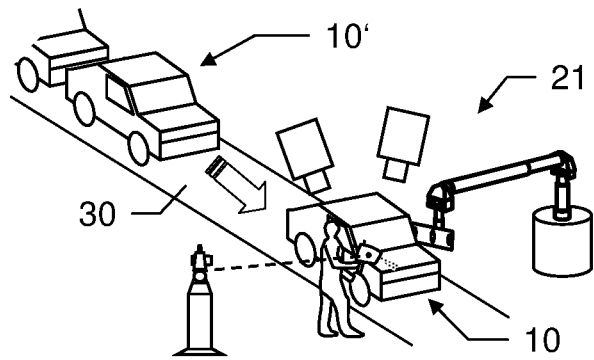
FIG. 5 shows a third embodiment of a measuring system according to the invention for measuring and visualising the output of a production process for a plurality of identical items.

In FIG. 5 another exemplary measurement system 1 for measuring a multitude of basically identical items—newly produced cars 10,10' —is depicted.

The term "basically identically items" in terms of this application is to be understood as meaning the same kind of objects, in particular wherein the objects differ from each other—if at all—only within given production tolerances and/or by alterations from the planned design due to production errors that are to be determined by means of the inventive method and system.

The measurement system comprises at least a first sensor system 21. Though only one sensor system is depicted here, preferably—as shown in FIG. 4—there can be at least two of them. The first sensor system 21 comprises a multitude of different sensors, which are all adapted to reference themselves relative to the cars 10,10'. In this embodiment, the computing means (not shown) is adapted to compare at least one of the measured or extrapolated values against a corresponding stored value—particularly a value of a car 10,10' that has been examined earlier—in order to determine a difference value. With this difference value, an image could be generated which represents the inspected cars 10,10', wherein an area or section of the image corresponding to an area or section of the car 10,10' associated with the at least one of the measured or extrapolated values which was compared to the stored value is visually coded to indicate the corresponding value or difference value.

Figure 6:
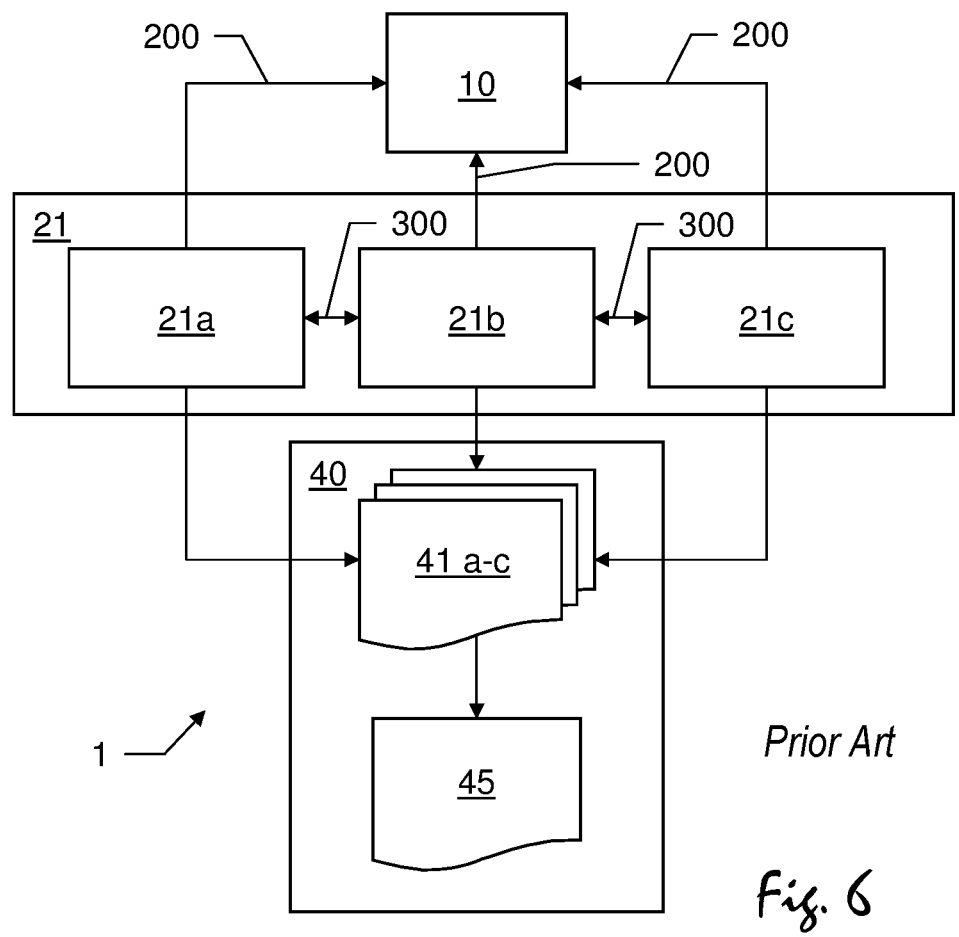
FIG. 6 is a flow chart representing a known method for measuring and visualising the output of a production process.

FIG. 6 shows a flow chart representing a known method for measuring and visualising the output of a production process. Such a method is disclosed in WO 98/27514.

The measuring system 1 of FIG. 6 comprises a sensor system 21 having three sensors 21a-c. The sensors 21a-c are adapted to create spatial data by measuring 200 values of features of an item 10, e. g. a surface geometry reconstruction, each sensor creating a local reconstruction of a portion of the item 10. The sensors 21a-c are also adapted to reference 300 themselves relative to each other, for instance by means of image stitching.

The depicted measuring system 1 also comprises a computer means 40. The spatial data generated by the sensors 21a-c is sent to the computer means 40 for combining the data, e. g. combining the local reconstructions to a surface geometry reconstruction 46 of the complete item 10. This is done by means of the referencing of the sensors 21a-c relative to each other.

Figure 7A:
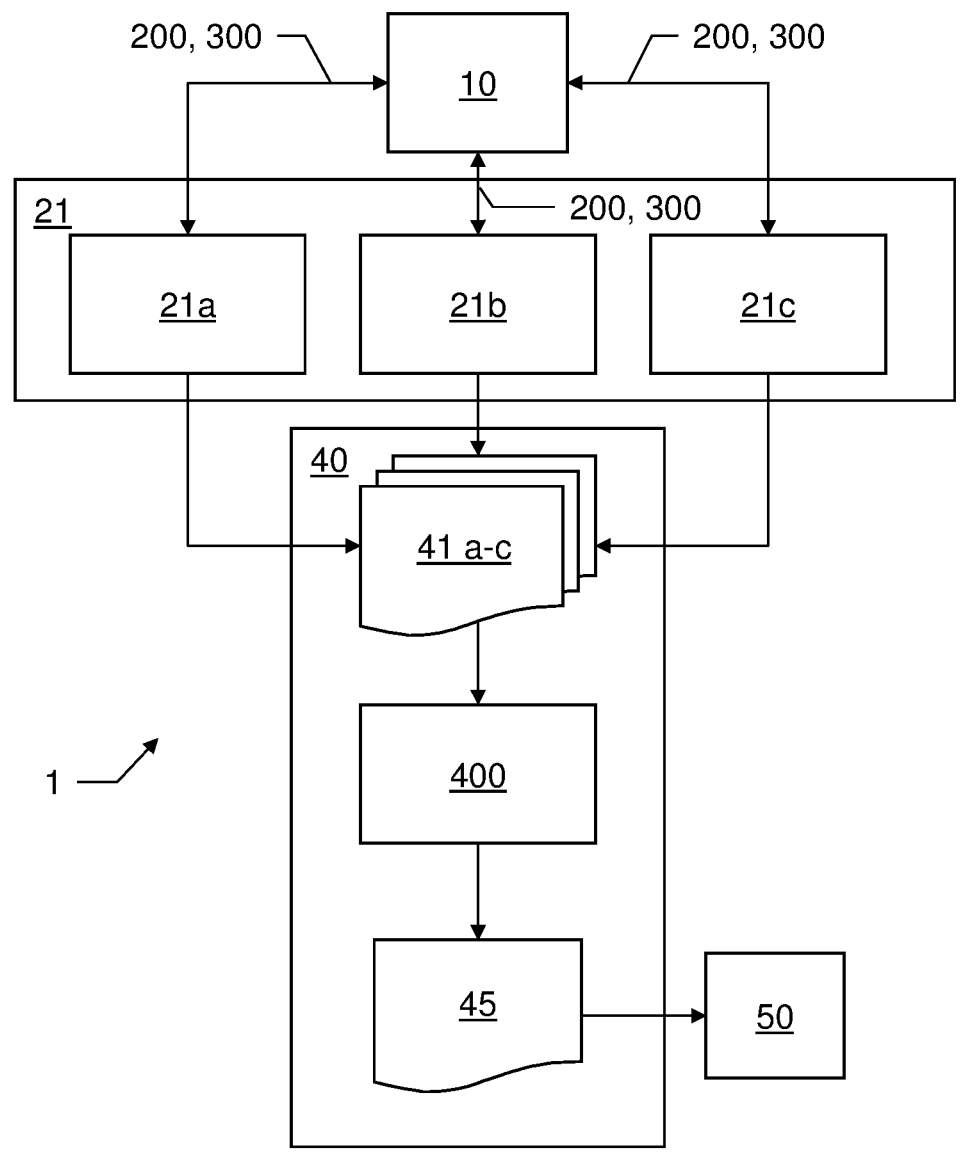
FIGS. 7a-c are flow charts representing three exemplary embodiments of a method according to the invention for measuring and visualising the output of a production process.
Figure 7B:
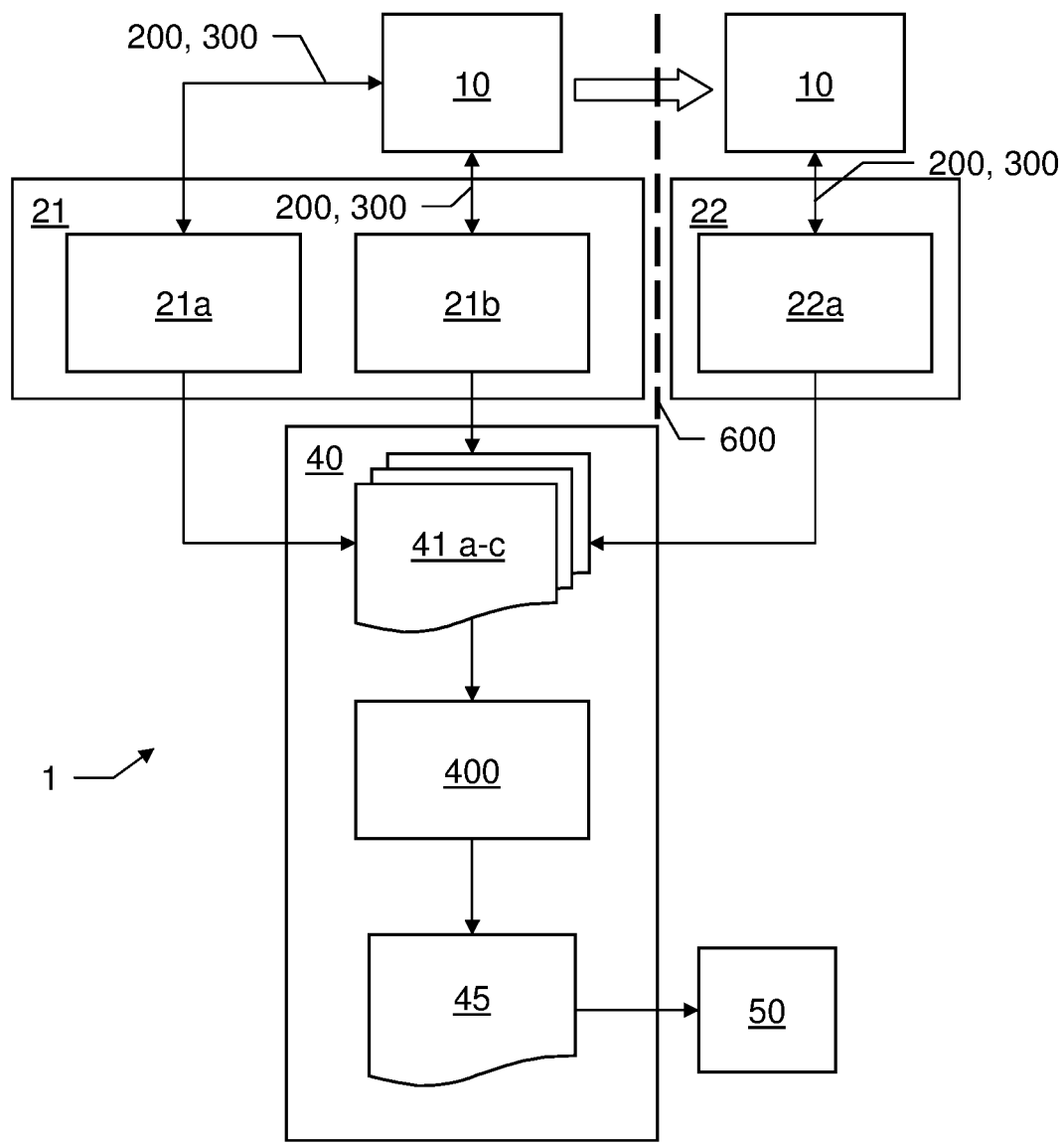
Figure 7C:
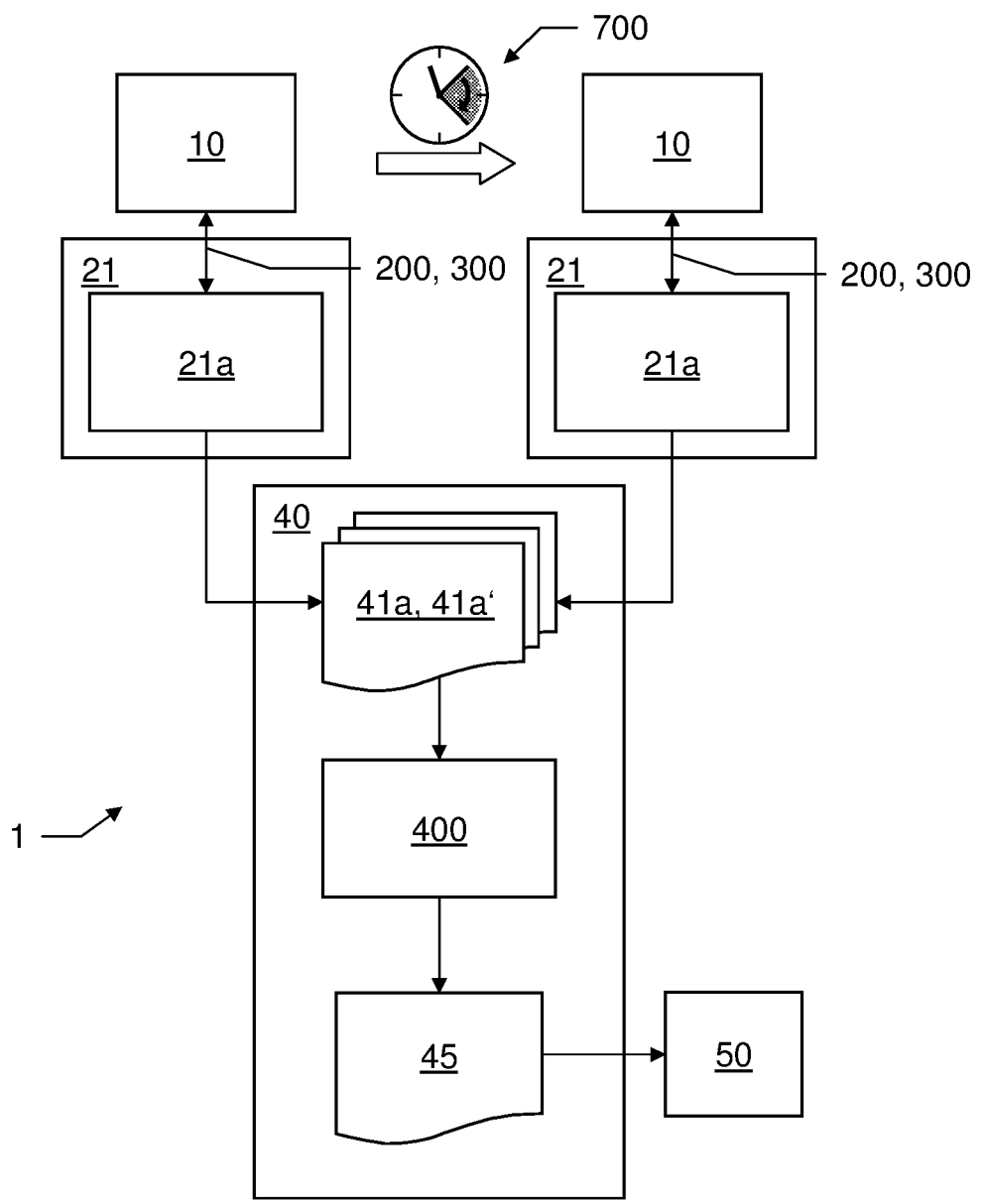

FIGS. 7a, 7b and 7c show flow charts representing three exemplary embodiments of a system and method according to the invention for measuring and visualising the output of a production process.

The measuring system 1 of FIG. 7a comprises a single sensor system 21 having three sensors 21a-c, being adapted to create spatial data by measuring 200 values of features of an item 10. The sensors 21a-c are also adapted to reference 300 themselves relative to the item 10, which means that at least one sensor 21a-c of the sensor system 21 is adapted for determining the position of a reference point of the item 10. In particular, for allowing a referencing of the sensors 21a-c in six degrees of freedom, the at least one sensor 21a-c is adapted to detect a position and orientation of a referencing means, e. g. a three-dimensional pattern comprising the reference point.

The depicted measuring system 1 also comprises a computer means 40. The spatial data generated by the sensors 21a-c is sent to the computer means 40 for combining the data. The data produced by the sensors 21a-c are provided in different sensor reference systems 41a-c that need to be transformed and unified into a unified reference system 45 for all sensors.

In the computer means 40 a reference system 45 is stored, being related to the item or to a support of the item. The spatial data of each of the three sensor reference systems 41a-c is transformed 400 into this common reference system, so that an item-related unified reference system 45 is created for all of the sensors 21a-c. Then, a common homogenised database for the values measured during the measurement is provided using the unified reference system. Optionally, based on the unified reference system 45 an image 50 representing the inspected item 10 can be generated.

When using, for instance, the software programme "CoreView Pro", in the unification process a number of input CTO files are read which are produced in the different measurement processes. Then information from all files is output into a single CTO file to be read by CoreView Pro and other authorized applications.

In FIG. 7b the measuring system 1 comprises two sensor systems, which are separated spatially, i.e. positioned at a certain distance 600 from each other. The first sensor system 21 comprises two sensors 21a-b, and the second sensor system 22 comprises one sensor 22a. The three sensors 21a-b,22 are adapted to create spatial data by measuring 200 values of features of the item 10. The sensors 21a-b,22a are also adapted to reference 300 themselves relative to the item 10, which means that at least one sensor 21a-b,22a of each sensor system 21,22 is adapted for determining the position of a reference point of the item 10. In particular, for allowing a referencing of the sensors in six degrees of freedom, the at least one sensor 21a-b,22a of each sensor system 21,22 is adapted to detect a position and orientation of a referencing means, e. g. a three dimensional pattern comprising the reference point. The item 10 is first measured by the sensors 21a-b of the first sensor system 21. Then, the item 10 is moved to the second sensor system 22, where it is measured by its sensor 22a.

The distance 600 between the two sensor systems 21,22 can be just a few meters, for instance when they are located in the same factory hall, so that the second measurement could be performed only seconds after the first measurement. The distance 600 could also be hundreds of kilometers, for instance when a produced part is transported to a different factory before assembling it with other parts, and measured before and after the transport. Also, further processing steps of a production process can be performed between the measurements by the two sensor systems 21,22. For instance, a first measurement with the first sensor system 21 measures values of a feature of the item 10 before a painting or assembling of the item 10, and a second measurement with the second sensor system 22 measures properties of the same feature after the painting or assembling.

In FIG. 7c the measuring system 1 comprises only one sensor system 21, which measures the same item 10 at two points of time, i.e. there is only a time interval 700 between a first measurement and a second measurement and no distance 600. In this time interval 700 the item 10 can either be moved away from the sensor system 21 and back or the item 10 stay at the sensor system 21 all the time. For instance, in this time interval 700 between the first and second measurements a further processing step could be performed elsewhere. The time interval could also be a cooling down time of the item 10, e. g. the item 10 is measured the first time just after a processing step which requires a high temperature, then cooling down during the time interval—either staying at the sensor system for a minute or stored somewhere else for a couple of hours—and then being measured by the same sensor system a second time.

FIGS. 8a-f show six exemplary ways for referencing the sensors relative to a reference point 12 of the item 10.

A measuring system 10 comprises a sensor system 21 with two sensors 21a,21b capturing image data of a part 11 of the item 10. Here, the item is a car 10 and the part is a roof 11 of the car.

Figure 8A:
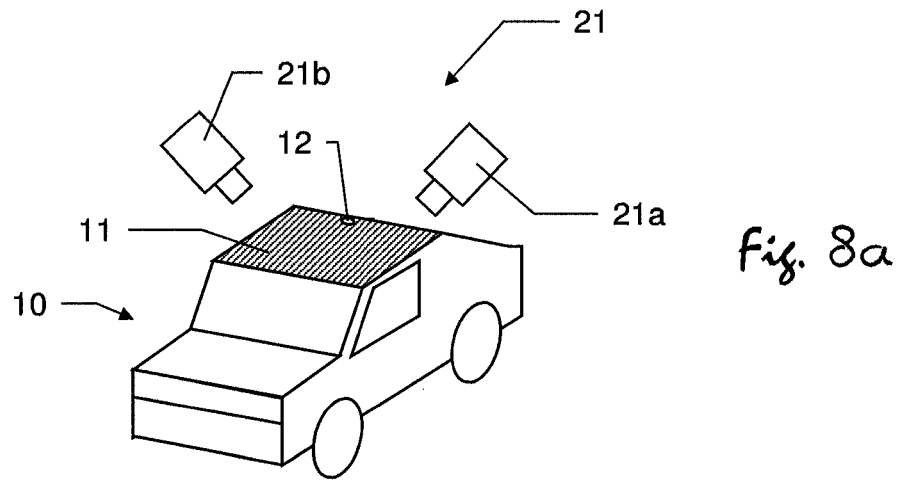
FIGS. 8a-f show six exemplary embodiments of a sensor system with a referencing of the sensors to a reference point.

In FIG. 8a a reference point 12 is positioned on the roof 11, for instance on an mounting of an antenna. The two sensors 21a-b are adapted for determining the position of reference point 12 on the car.

Figure 8B:
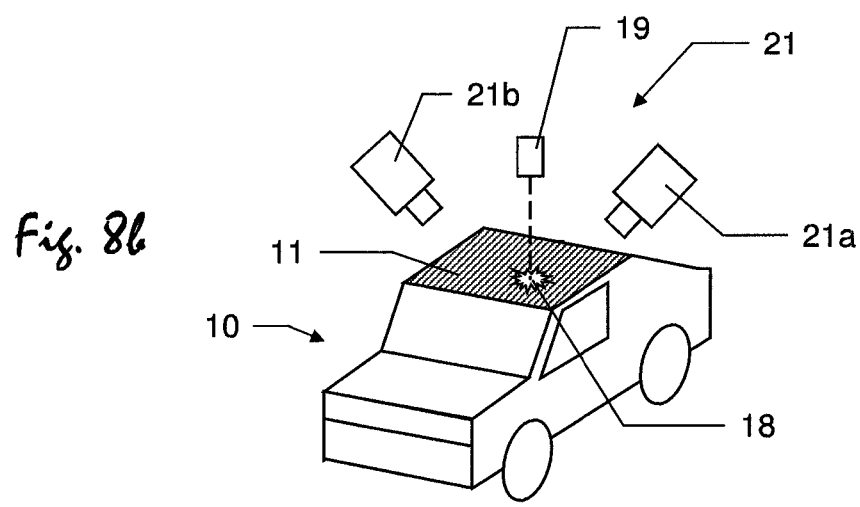

In FIG. 8b the sensor system comprises a projecting means 19 projecting a laser spot 18 onto the roof 11, the position of the laser spot 18 being determinable by the two sensors 21a-b. Preferably, the projecting means 19 is adapted to project a pattern which allows a referencing of the sensors 21a-b in six degrees of freedom.

Figure 8C:
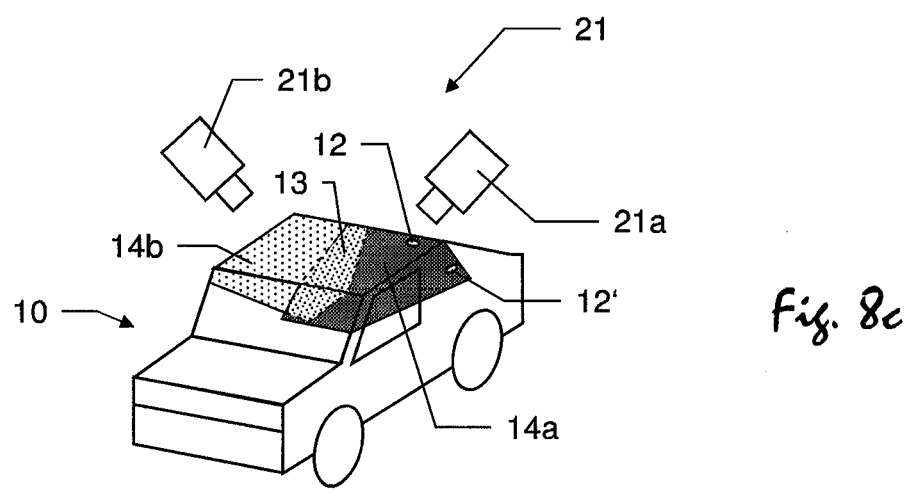

In FIG. 8c there are two referencing points 12,12' that are determinable by the first sensor 21a only. Each sensor 21a-b is adapted to take an image 14a-b of a part of the roof 11, wherein the images 14a-b have a common overlap area 13. By means of image stitching, also the second sensor 21b can be referenced to the reference points 12,12'.

Figure 8D:
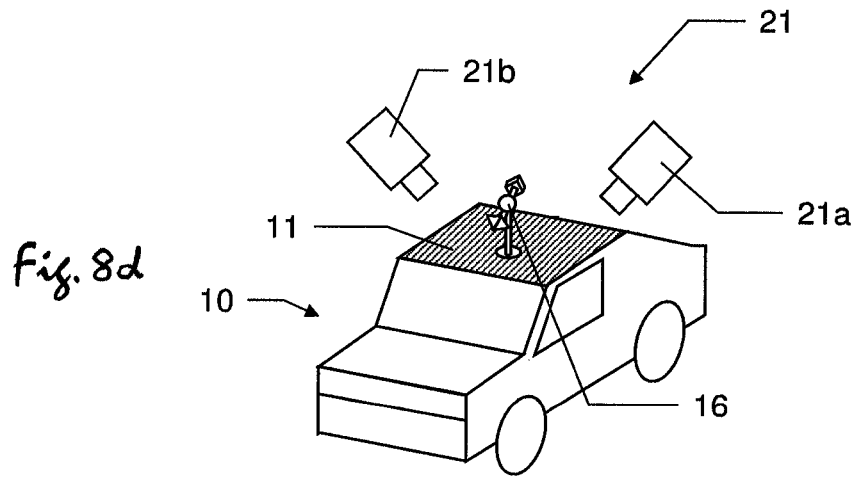
Figure 8E:
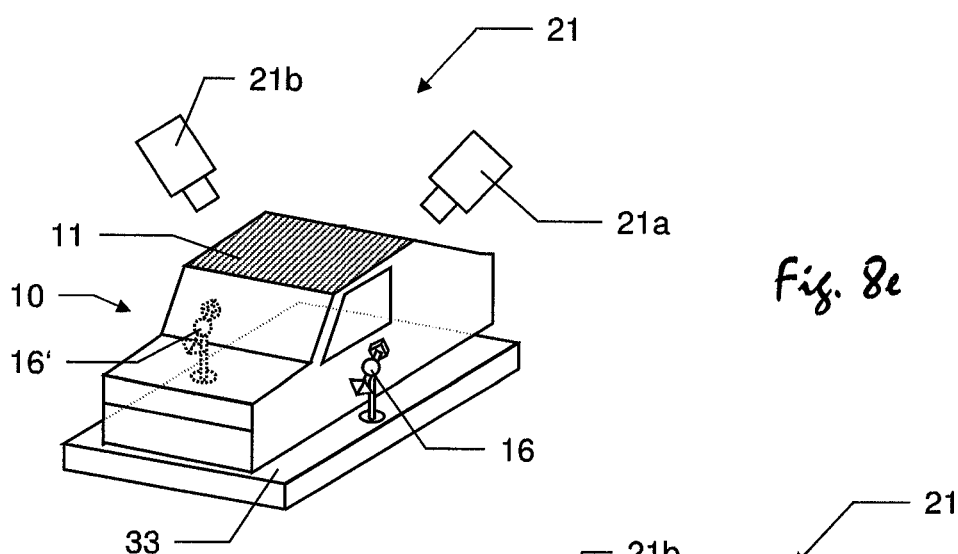
Figure 8F:
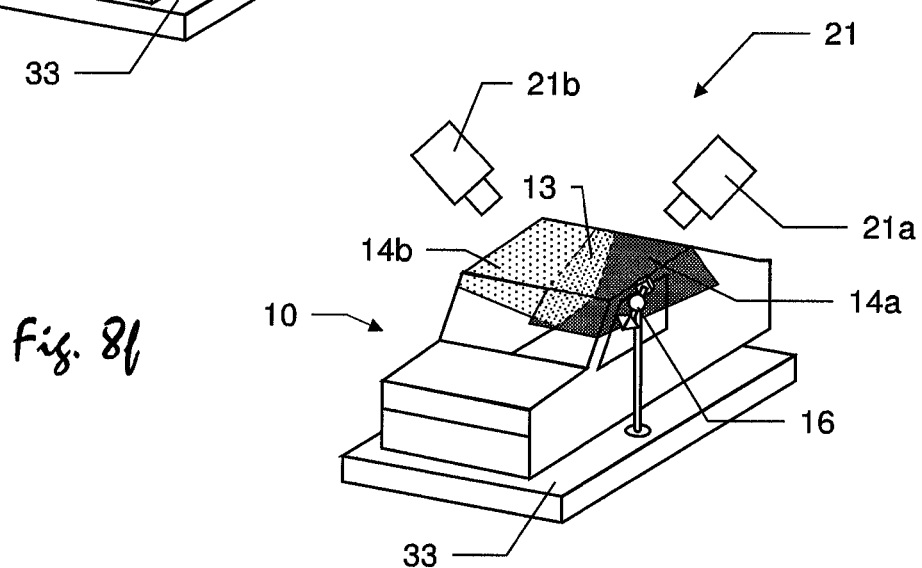

In FIGS. 8d, 8e and 8f the reference point is part of a referencing means 16, allowing a referencing of the sensors 21a-b in six degrees of freedom.

The referencing means 16 has visible features that are identifiable by at least one sensor of the sensor system 21. The visible features are an arrangement of passive visible features such as one or more geometrical objects of well defined shape and/or colour. They can also comprise fluorescent or retro reflective surfaces. For example, they can provide contrast faces and/or a known shape or geometry for making them identifiable in an image of an image sensor. The visible features can be naturally occurring features which are visible and identifiable in the image, for example textures, edges, differently coloured sections, etc. They can also be embodied by artificially applied visible features such as markers.

The visible features of the referencing means 16 can also be active light points, for example in form of optical emitters such as light bulbs, LEDs, lasers, fluorescent material, etc. which are emitting continuous or pulsed light. As a single visible feature, in particular of unknown shape and size, is in general not sufficient to determine a spatial reference in five or six degrees of freedom, a set of multiple visible features is used for referencing by the sensors. The visible features can also comprise a retro-reflector traceable by a laser tracker for measuring a position of the referencing means 16.

In FIG. 8d the referencing means 16 is positioned on the measured part, i.e. the roof 11 of the car 10, its position and orientation being determinable by both sensors 21a-b.

In FIG. 8e two referencing means 16,16' are positioned on a support 33 of the car 10. The position and orientation of the car 10 on the support 33 is fixedly defined, as for instance disclosed in the European patent application with the application Ser. No. 12/425,140.6. By determining the position and orientation of one of the referencing means 16,16' the sensors 21a-b can be referenced in six degrees of freedom.

FIG. 8f shows a combination of the solutions of FIGS. 8c and 8e: One referencing means 16 is positioned on the support 33 and determinable only by the first sensor 21a. By means of image stitching also the second sensor is referencible relative to the referencing means.

Alternatively, also the sensors themselves can be equipped with sensor referencing means, designed for instance as described above for the referencing means 16. Then, for the provision of a unified item-related reference system for all sensors, external referencing devices, such as laser trackers, can be used to continuously determine the spatial orientation of the item and of the sensors, preferably in six degrees of freedom.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for analyzing spatial measuring data, the method comprising:
an evaluation process with a multitude of measurement processes that are distributed over the elements of a set of one, two, or a multitude of basically identical items, the items each having one or more features, the multitude of measurement processes comprising at least a first and a second measurements of spatial data by means of at least one sensor system comprising at least one sensor, wherein each measurement of spatial data comprises:
providing a sensor reference system for each sensor, and
measuring one or more spatial values of the features of an item of the set of items by means of the at least one sensor, characterized by a spatial distance between the first and second measurements of spatial data;
wherein the method further comprises:
transforming the sensor reference systems and providing a unified reference system for all sensors, the unified reference system being related to at least one item of the set of items or to a support of the at least one item of the set of items;
subtracting sensor-related errors from the measured spatial data; and
providing a database for the values measured during the first and second measurements of spatial data with the unified reference system.

2. The method according to claim 1, wherein:
the first and second measurements of spatial data are performed on the same item, wherein a processing step of the item is performed between the first and second measurements of spatial data; and
the second measurement of spatial data is performed by a different sensor system than the first measurement of spatial data, wherein a plurality of measurements of spatial data of the same item is performed sequentially by a plurality of sensor systems.

3. The method according to claim 1, wherein:
the first and second measurements of spatial data are performed on the same item, wherein a processing step of the item is performed between the first and second measurements of spatial data; and
a plurality of measurements of spatial data of the same item are performed sequentially by a plurality of sensor systems.

4. The method according to claim 1, wherein:
the first and second measurements of spatial data are performed on the same item, wherein a processing step of the item is performed between the first and second measurements of spatial data; and
at least two measurements of spatial data of the same item are performed by the same sensor system.

5. The method according to claim 1, wherein:
the spatial distance between the first and second measurements of spatial data, comprises a spatial distance between a first position and a second position of the same sensor system, wherein the sensor system performs the first measurement in the first position and the second measurement in the second position.

6. The method according to claim 1, wherein:
the spatial distance between the first and second measurements of spatial data, comprises a spatial distance between a first sensor system performing the first measurement of spatial data and a second sensor system performing the second measurement of spatial data.

7. The method according to claim 1, wherein:
providing a sensor reference system comprises a referencing of the at least one sensor to a reference point, wherein
the reference point has a defined position in the unified reference system, either being positioned on at least one item of the set of items or on a support, on which the position of at least one item of the set of items is fixedly defined, and
the position of the reference point is determinable by the at least one sensor of each sensor system,
wherein the reference point is a projection of a projecting means of the respective sensor system, or
part of a referencing means adapted to allow a referencing of the sensors in six degrees of freedom.

8. The method according to claim 7, wherein:
the respective sensor system comprises a laser spot or a part of a projected laser line or pattern.

9. The method according to claim 7, wherein:
referencing the sensors to the reference point comprises an image or data stitching process for combining data of the sensors of the respective sensor system by using overlapping spatial data of at least two sensors.

10. The method according to claim 1, wherein:
providing a sensor reference system comprises a referencing of the at least one sensor to a reference point, wherein
the reference point has a defined position in the unified reference system, either being positioned on at least one item of the set of items or on a support, on which the position of the at least one item of the set of items is fixedly defined, and
the position of the reference point and a position and orientation of the at least one sensor are determinable by an external referencing system comprising at least one external referencing device, wherein
the at least one sensor comprises sensor referencing means adapted to allow determining the orientation of the sensor in six degrees of freedom, and
the reference point is part of a referencing means adapted to allow a referencing of the external referencing device in six degrees of freedom.

11. The method according to claim 1, wherein:
generating an image representing the at least one measured item of the set of items and comprising measured values of the features of the at least one measured item of the set of items,
wherein the method further comprises comparing at least one of the measured values against a corresponding stored value to determine a difference value, and wherein the generated image represents the at least one measured item of the set of items, wherein an area or section of the image corresponding to an area or section of the at least one measured item of the set of items associated with the at least one of the measured values which was compared to the stored value is visually coded to indicate the corresponding value or difference value.

12. A measuring system for analyzing spatial measuring data, the measuring system being adapted for an evaluation process with a multitude of measurement processes that are distributed over the elements of a set of one, two or a multitude of basically identical items, the items each having one or more features,
providing a sensor reference system for each sensor, and
measuring one or more spatial values of the features of one of the items by means of the at least one sensor,
the measuring system comprising at least one sensor system with at least one sensor, the at least one sensor system being adapted for performing the multitude of measurement processes, the multitude of measurement processes comprising at least a first and a second measurements of spatial data of one of the items,
wherein the at least one sensor is adapted to:
reference itself to a reference point, providing a sensor reference system for every sensor, and
measure one or more spatial values of each feature of the set of items, wherein:
the at least one sensor system is adapted to perform the first and second measurements of spatial data with a spatial distance between the first and second measurements, and computing means of the measuring system are adapted to
transform the sensor reference systems into a unified reference system for all sensors, the unified reference system being related to at least one item of the set of items or to a support of the at least one item of the set of items;
subtract sensor-related errors from the measured spatial data; and
provide a database for the values measured during the first and second measurements of spatial data with the unified reference system.

13. The measuring system according to claim 12, wherein:
the reference point has a defined position in the unified reference system, either being positioned on at least one item of the set of items or on a support, on which the position of the at least one item of the set of items is fixedly defined, and
at least one sensor of each sensor system is adapted for determining the position of the reference point.

14. The measuring system according to claim 12, wherein:
the reference point is part of a referencing means adapted to allow a referencing of the at least one sensor in six degrees of freedom, and/or
at least one sensor system comprises projecting means adapted for projecting the reference point on the at least one item of the set of items or on the support, in form of a laser spot or as a part of a projected laser line or pattern.

15. The measuring system according to claim 12, wherein:
for referencing the at least one sensor to the reference point, at least two sensors are adapted for taking images of a part of the at least one item of the set of items, wherein the images have a common overlap area, wherein the computing means is adapted to use image or data stitching for combining data of the sensors of the respective sensor system.

16. The measuring system according to claim 12, wherein:
for referencing the at least one sensor to the reference point in six degrees of freedom and/or for transforming the sensor reference systems into a unified reference system, an external referencing system comprising at least one external referencing device is adapted for determining the positions and orientations of the at least one sensor and the reference point, wherein the external referencing device is a laser tracker, the at least one sensor comprises sensor referencing means and the reference point is part of a referencing means.

17. The measuring system according to claim 12, wherein:
  a support adapted to accept at least one item of the set of items in such a way that the position of the item is fixedly defined relative to the support, wherein the support comprises the reference point,
  wherein the support comprises referencing means comprising a pattern that at least one sensor of the respective sensor system is adapted to detect, allowing a referencing of the sensors in six degrees of freedom.

18. The measuring system according to claim 12, wherein:
  the computing means of the measuring system is adapted to generate an image representing the set of items, wherein
  the computing means is adapted to compare at least one of the measured values against a corresponding stored value to determine a difference value; and
  an area or section of the image corresponding to an area or section of the set of items associated with the at least one of the measured values which was compared to the stored value is visually coded to indicate the corresponding value or difference value.

19. A non-transitory computer program product, comprising program code which is stored on a machine-readable medium, having computer-executable instructions for performing:
  transform the sensor reference systems and provide a unified reference system for all sensors, the unified reference system being related to at least one item of the set of items or to a support of the at least one item of the set of items;
  subtract sensor-related errors from the measured spatial data; and
  provide a database for the values measured during the first and second measurements of spatial data with the unified reference system.

* * * * *